INVENTOR.
JAMES C. WHITING
BY
William N. Antonis
ATTORNEY

United States Patent Office 3,283,907
Patented Nov. 8, 1966

3,283,907
FILTER WITH AUTOMATIC SHUT-OFF VALVE
James C. Whiting, Madison Heights, Mich., assignor to The Bendix Corporation, Madison Heights, Mich., a corporation of Delaware
Filed Aug. 8, 1963, Ser. No. 300,888
3 Claims. (Cl. 210—234)

This invention relates to filters and more particularly to an automatic shut-off valve therefor.

One of the objects of this invention is to provide a filter unit having an automatic shut-off valve which will permit a relatively unrestricted flow path through the unit as long as the bowl and filter element are installed, but which will close when the bowl and element are removed for servicing, thus preventing flow through the head from port to port and preventing external leakage even when the system is under pressure.

Another object of this invention is to provide a filter unit which can be disassembled for replacement of the filter element therein and can be subsequently reassembled without introducing air into the fluid system in which the filter unit is located.

A further object of this invention is to provide an automatic shut-off valve for a filter unit which utilizes a movable sleeve type member for preventing flow between the inlet and outlet ports after the removal of the filter bowl.

A still further object of this invention is to provide a shut-off valve which requires relatively little movement of the sleeve type member to move from an inoperative to an operative position.

Another object of this invention is to provide a movable sleeve type member in an automatic shut-off valve which will seal on the upper and lower surfaces thereof, thereby permitting a simplified construction, greater ease of servicing, and reduced wear on the threads in the filter bowl and head.

A further object of this invention is to provide sealing means in connection with the automatic shut-off valve which will accommodate dimensional variations existing between adjacent components.

Another object of this invention is to provide means for insuring that the shut-off valve will be fully opened when the bowl is re-installed. This may be accomplished by over-travel means comprising a series of Belleville washers located at the lower end of the filter element in conjunction with a screw which may be adjusted to preload the spring washers and vary the free length of the filter element without imposing severe manufacturing tolerances on the element components.

Figure 1:
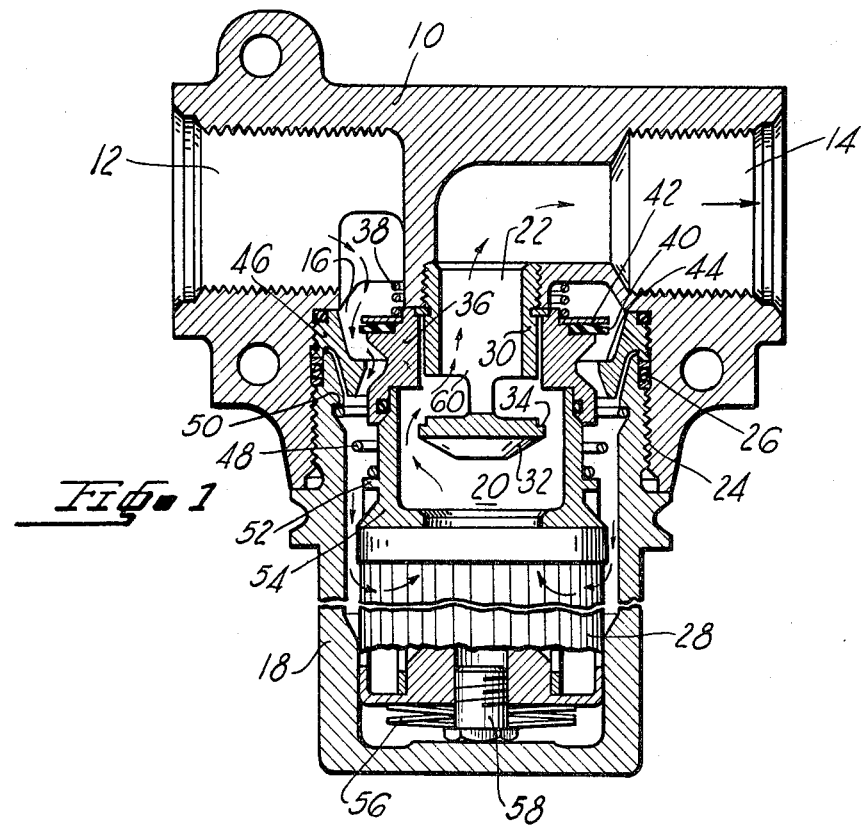
Figure 2:
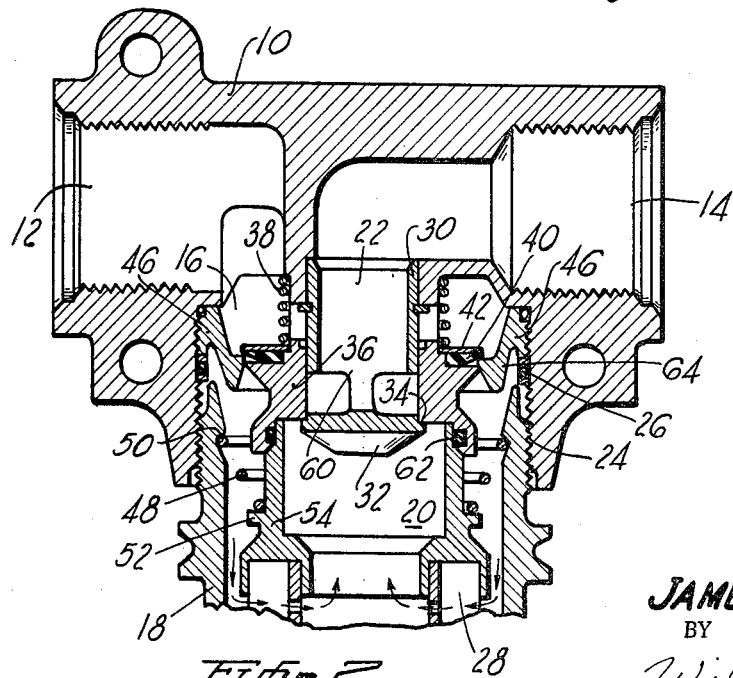

Other objects and advantages of this invention will become apparent from the following description taken in connection with the accompanying drawing which forms a part of this specification and in which:

FIGURE 1 is a partially broken away sectional view of a filter unit incorporating my automatic shut-off valve in an open position; and FIGURE 2 is a partially broken away sectional view similar to FIGURE 1 in which the automatic shut-off valve has moved to a closed position.

Referring to FIGURE 1 it will be seen that the numeral 10 indicates a filter head having an inlet port 12 and an outlet port 14 which communicate with each other via passage 16, fluid bowl 18, and passages 20 and 22, respectively. The bowl is secured in place to the lower side of the head 10 by screw threads 24 and sealed thereto in fluid tight relationship by an O-ring 26. A suitable filter element 28 is disposed in the fluid bowl in such a manner that fluid flowing between the inlet port 12 and outlet port 14 will flow therethrough, as indicated by the arrows.

A guide member 30 having a valve stop member 32 formed on the end thereof is attached to the filter head 10 and extends towards the filter bowl 28. A valve seat 34 is formed on the upper surface of valve stop member 32. A valve spool or sleeve 36 is slidably mounted on guide member 30 and is urged by spring 38 towards a closed position, namely to a position wherein valve sleeve 36 is in metal-to-metal contact with valve seat 34 formed on valve stop member 32. The valve sleeve 36 carries a flexible gasket 40 backed up by a rigid washer 42, said gasket being arranged to contact the inner edge 44 of ring 46.

The filter element 28 is retained within filter bowl 18 through means of spring 48 which abuts a shoulder 50 formed on bowl 18 and a flange 52 formed on a retainer 54, thereby urging the filter element towards the bottom of the bowl. Interposed between the lower end of the filter element and the bottom of the bowl is a series of Belleville washers 56 and a screw 58 for adjusting the preload of these spring washers.

Referring to FIGURE 1 wherein the shut-off valve is in an open position, it will be seen that fluid enters the inlet port 12, passes downward through the annular passage 16 formed between valve sleeve 36 and ring 46 and then enters the filter bowl 18. After passing through the filter element 28, the filtered fluid proceeds upward through passage 20, through the radial passages 60 of the guide member 30, through passage 22, and out through outlet port 14. A seal ring prevents internal flow from the inlet port to the outlet port.

When the bowl is partially removed, as indicated in FIGURE 2, spring 38 causes the valve spool or sleeve 36 to move downward against the valve seat 34 of valve stop member 32 so that the intimate metal-to-metal contact prevents external leakage from the outlet passage. Simultaneously, the flexible lip of gasket 40 contacts the inner edge 44 of ring 46 thereby preventing external leakage from the inlet passage. The flexibility of the gasket 40 serves to accommodate dimensional variations which may exist between adjacent components.

After the bowl 18 has been completely removed from the head 10, the old filter element can be removed and a new filter element can be inserted therein. This new filter element will be retained in place by the spring 48. After this is completed the bowl should be filled with fluid and engaged in the head through means of the screw threads.

After the bowl has been initially threaded onto the head and at a point approximately as indicated in FIGURE 2, the upper end 54 of filter element 28 will come in contact with seal 62 located on valve sleeve 36. Since the bowl was initially full of fluid and a portion of the fluid has been displaced, it can be seen that the amount of air in the annular space above the upper edge of the bowl is very small. Furthermore, the triangular section 64 on the lower edge of ring 46 not only facilitates assembly, but also serves to permit displacement of this air by permitting the air to bleed outwardly and be displaced through the threads 24 until the upper edge of the bowl has advanced into contact with O-ring seal 26. In this manner the amount of air trapped therein is minimal if not non-existent.

As the upper end 54 of filter element 28 pushes on the valve spool 36 causing it to open, it will be obvious that the length of the element must be closely controlled to initiate opening at the correct point. Also in order to ensure that the shut-off valve is fully opened when the bowl is re-installed, a means of over-travel must be provided on the element. This is accomplished by using the previously mentioned series of Belleville washers 56 on the lower end of the filter element in conjunction with the screw 58 which may be adjusted to preload the spring washers and also to adjust the free length of the element to close limits without imposing severe manufacturing tolerances on the element components. The preload of the spring washers is calculated to exceed the load of shut-off spring 38.

Although this invention has been described in connection with a specific embodiment, it will be obvious to those skilled in the art that various changes may be made in the form, structure and arrangement of parts without departing from the spirit of the invention. Accordingly, applicant does not desire to be limited to the specific embodiment disclosed herein primarily for purposes of illustration, but instead desires protection falling within the scope of the appended claims.

Having thus described the various features of the invention, what I claim as new and desire to secure by Letters Patent is:

1. A filter unit comprising a head having an inlet port and an outlet port communicating respectively with outer and inner concentric chambers, a hollow cylindrical guide member operatively connected to said head for separating said outer and inner concentric chambers, a valve stop member formed integrally with and extending from said guide member, said valve stop member having a valve seat formed on the upper surface thereof, a ring member located in said outer chamber and concentrically positioned with respect to the cylindrical guide member, said ring member having a valve seat formed on the upper surface of the inner edge thereof, a cylindrical valve sleeve located between said guide and ring members and slidable on said guide member from an open to a closed position, lower and upper sealing means located on said valve sleeve for engagement respectively with the valve seats formed on the valve stop and ring members when said valve sleeve moves to a closed position to thereby prevent communication between the outlet port and the inner concentric chamber and between the inlet port and the outer concentric chamber, resilient means for urging said valve sleeve from an open to a closed position, a bowl removably attached to the head in sealing engagement therewith, a filter element located in said bowl, means operatively connected to said filter element and bowl for urging the filter element towards the bottom of the bowl, said filter element being in abutting relationship with said valve sleeve and causing same to move from a closed position to an open position upon sealing engagement of said bowl with said head, and adjustable resilient means interposed between the lower end of the filter element and the bottom of the bowl for varying the preload of said resilient means and the free length of the filter element to insure proper movement of said valve sleeve from its closed to its open position.

2. A filter unit, as defined in claim 1, wherein said adjustable resilient means includes a series of Belleville washers and a screw for adjusting the preload and length of said series of washers.

3. A filter unit comprising a head having an inlet port and an outlet port communicating respectively with outer and inner concentric chambers, a hollow cylindrical guide member operatively connected to said head for separating said outer and inner concentric chambers, a valve stop member formed integrally with and extending from said guide member, said valve stop member having a valve seat formed on the upper surface thereof, a ring member located in said head and concentrically positioned with respect to the cylindrical guide member, said ring member having a valve seat formed on the upper surface of the inner edge thereof and an annular groove formed on the lower face thereof, a cylindrical valve sleeve located between said guide and ring members and slidable on said guide member from an open to a closed position, sealing means formed on the lower portion of said valve sleeve for engagement with the valve seat formed on said valve stop member to prevent communication between the outlet port and the inner concentric chamber, a flexible washer-like gasket operatively connected to the upper portion of said sleeve and extending therefrom to form lip-tight sealing means for engagement with the valve seat formed on the upper surface of the inner edge of said ring member to prevent communication between the inlet port and the outer concentric chamber, said flexibility serving to accommodate dimensional viariations which may exist between cooperating components, spring means for urging said valve sleeve from an open position to a closed position wherein said sealing means are in engagement with their associated valve seats, annular sealing means located adjacent the annular groove formed on the lower face of said ring member, said last mentioned sealing means being in contact with said ring member and said head, a bowl adapted for threadedly engaging said head, said bowl having the open end thereof formed to engage said annular sealing means and enter said annular groove only after trapped air has been permitted to escape via said annular groove and threaded portions of said bowl and head, a filter element located in said bowl, spring means operatively connected to said filter element and bowl for urging the filter element towards the bottom of the bowl, said filter element being in abutting relationship with said valve sleeve and causing same to move from a closed position to an open position as the open end of said bowl engages said annular sealing means and enters said annular groove, a series of Belleville washers interposed between the lower end of the filter element and the bottom of the bowl, and means for adjusting the preload of said washers to thereby adjust the combined free length of the filter element and retainer and insure proper movement of said valve sleeve from its closed to its open position.

References Cited by the Examiner

UNITED STATES PATENTS

| | | | |
|---|---|---|---|
| 2,459,376 | 1/1949 | Hallinan | 210—352 X |
| 2,544,244 | 3/1951 | Vokes | 210—234 |
| 2,932,400 | 4/1960 | Scavuzzo | 210—235 |
| 2,945,591 | 7/1960 | Pall | 210—234 |
| 3,040,894 | 6/1962 | Pall | 210—235 X |
| 3,080,972 | 3/1963 | Smith | 210—235 X |

REUBEN FRIEDMAN, *Primary Examiner.*

SAM ZAHARNA, C. M. DITLOW, *Examiners.*